Patented Feb. 26, 1946

2,395,400

UNITED STATES PATENT OFFICE 2,395,400

COMPOSITION OF MATTER AND METHOD OF MAKING SAME

Melvin De Groote, University City, Mo., assignor to Petrolite Corporation, Ltd., Wilmington, Del., a corporation of Delaware No Drawing. Original application September 8, 1941, Serial No. 410,084. Divided and this application June 21, 1943, Serial No. 491,730

7 Claims. (Cl. 260—404.5)

This invention consists of a new composition of matter and a method of making same, my present application being a division of my pending application Serial No. 410,084, filed September 8, 1941, which matured as U. S. Patent No. 2,342,650, dated February 29, 1944, and which in turn, was a continuation in part of the application that resulted in my U. S. Patent No. 2,262,741, dated November 11, 1941.

My said Patent No. 2,262,741, discloses a process for preventing water-in-oil type emulsions resulting from acidization of calcareous oil-bearing strata, wherein the treating agent employed is a composition of matter consisting of a mineral acid, such as hydrochloric acid, in admixture with a particular emulsion-preventing agent that is specifically described in said patent. In said patent the emulsion-preventing agent is referred to, in view of the most suitable method of manufacture, as a condensation product. Attention is directed to the aforementioned patent to the extent that said patent is concerned, not only with a description of certain cation-active materials, but also to the extent that said patent indicates utility for such materials, as, for example, in demulsification of crude petroleum or of similar procedure involving the removal of salt in refining practice.

The subject-matter of the instant specification is substantially a verbatim copy of the subject-matter appearing in my said Patent No. 2,262,741, except that there is eliminated such data as is concerned primarily with acidization of calcareous structures, and reference to the matter contemplated is as a condensation product, chemical product, or the like, rather than specific reference to it as an emulsion-preventing agent.

The condensation product or chemical compound that constitutes my present invention is obtained by reaction between a higher molecular weight monocarboxy acid or its functional equivalent, and a polymerized polyamine derived from a hydroxylated polyamine containing at least one nitrogen atom not directly linked to a hydroxy hydrocarbon radical, and preferably, at least two amino nitrogen atoms not directly linked to a hydroxy hydrocarbon radical. Such reactants are mixed together so that there is at least one mole of the high molal carboxy acid for each mole of polymerized hydroxylated polyamine; and there may be several moles of such high molal carboxy acid combined with each mole of the polymerized hydroxylated amine. Such condensation is effected by the action of the heat generally at a temperature above 100° C., and may be conducted at a temperature as high as 300° C. Generally speaking, the range of 150-175° C. represents an optimum temperature. Preferably, condensation is conducted by first polymerizing such hydroxylated amines and then condensing the polymerized hydroxylated polyamine with the selected acid. Polymerization catalysts consist of materials of the kind commonly employed to polymerize hydroxylated monoamine, such as triethanolamine. They include materials such as caustic soda, caustic potash, high molal amines, soaps, sodium glycerate, sodium methylate, sodium ethylate, and the like. The amounts used vary from 1% to approximately 0.1%, or even less. Polymerization is generally conducted at a temperature range of approximately 225-275° C. Constant stirring is desirable during polymerization, and condensation. Such condensation products are usually cation-active materials.

The detailed composition of the products obtained is not known, although, in a general way, ester linkages must be involved.

As indicated, an amine may act as a catalyst; or, stated another way, the hydroxylated amine of the kind employed as a reactant in the production of the emulsion-preventing agent or condensation product, may act as its own polymerization catalyst. For instance, in condensation product Examples 1-8, inclusive, as described subsequently, the added catalyst may be eliminated or reduced, with probable increased time of condensation being required. Thus, in the hereto appended claims, reference to a catalyst is intended to include the amine itself, as well as an added catalyst, if employed. For this reason many of the properties of the materials are unpredictable.

It is surprising to find that such materials are stable for an extended period of time in half-concentrated hydrochloric acid, or other similar mineral acids. It is likewise remarkable to note that such solutions in acid, and particularly in relatively low ratios, as hereinafter described, give a very pronounced lowering of the surface tension. This is especially true in such compounds or condensation products that are derived at relatively high temperatures, and especially if derived from polyamino reactants, having at least two amino nitrogen atoms not directly linked to a hydroxy hydrocarbon radical. It is difficult to indicate a detailed probable structure for such compounds which would account for their resistance to decomposition in strong acid solution.

Materials of the kind herein contemplated are derived from various reactants. One class of reactants consists of higher molecular weight carboxy acids, and particularly monocarboxy acids or their functional equivalents, such as the acyl halide, ester, amide, etc. The expression "higher molecular weight carboxy acids" is an expression frequently employed to refer to certain organic acids, particularly monocarboxy acids, having more than 8 carbon atoms, and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils, such as those mentioned; hydroxy and alphahydroxy higher carboxylic aliphatic and fatty acids, such as dihydroxystearic acid, dihydroxy palmitic acid, dihydroxybehenic acid, alphahydroxy capric acid, alyphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carbaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroabietic acid, aralkyl and aromatic acids, such as benzoic acid, Twitchell fatty acids, naphthoic acid, carboxydiphenyl pyridine carboxylic acid, hydroxybenzoic acid, and the like. Other suitable acids include phenylstearic acid, benzoylnonylic acid, cetyloxyacetic acid, chlorstearic acid, fencholic acid, cetyloxybutyric acid, etc.

Insofar that the fatty acids are preferably employed as a source of the acyl radical, obviously one need not use the fatty acids themselves, but may employ any obvious functional equivalent, such as an ester, anhydride, amide, acyl halide, etc. It is understood that in the hereto appended claims reference to formation of a condensation product being derived from an acid is intended to include such obvious functional equivalents. In such instances, instead of elimination of water, one may have some other compound, such as ammonia or hydrochloric acid, eliminated.

As has been previously indicated, the second class of reactants is obtained by polymerization of certain hydroxylated polyamines.

Such hydroxylated polyamines characterized by the presence of at least one amino nitrogen atom not directly attached to a hydroxy hydrocarbon radical, are well known compounds. They may be obtained in various ways. The commonest procedure is to treat a polyamine with an alkylene oxide or its equivalent, such as ethylene oxide, propylene oxide, glycidol, or the like. The commoner polyamines which can be so treated with an oxyalkylating agent include the following: Ethylene diamine, diethylene triamine, triethylene tetramine, tetraethylene pentamine, pentaethylene hexamine, propylene diamine, dipropylene triamine, tripropylene tetramine, tetrapropylene pentamine, pentapropylene hexamine, etc. In some instances such amines may be treated with an alkylating agent or the like so as to introduce an alkyl, aralkyl, or alicyclic radical into the compound as a substitute for an amino hydrogen atom. For instance, one may obtain diethyl tetraethylene pentamine in the conventional manner, using ethyl iodide or the like as an alkylating agent.

In any event, having selected a suitable polyamine, the product is then treated with any acceptable oxyalkylating agent, such as ethylene oxide, propyleneoxide, and the like. In view of the lower cost of ethylene oxide, and in view of its greater activity, it is most frequently employed. For instance, ethylene diamine can be treated with one mole of ethylene oxide to produce hydroxyethyl ethylene diamine. Diethylene triamine can be treated with three moles of ethylene oxide so as to yield triethanol diethylene triamine. Triethylene tetramine can be treated with four moles of ethylene oxide to yield tetraethanol triethylene tetramine. Similarly, one can obtain tetraethanol tetraethylene pentamine, or tetraethanol pentaethylene hexamine. One can employ propylene oxide or glycidol to give similar products. In view of the fact that the most inexpensive polyamine now available is tetraethylene pentamine, I prefer to treat tetraethylene pentamine with three moles, four moles, or five moles of ethylene oxide to give the corresponding triethanol, tetraethanol, and pentaethanol derivatives and to employ such derivatives.

In the manufacture of the emulsion-preventing agent or condensation agent herein described, it is sometimes desirable to add a polyhydric alcohol, such as glycerol, ethylene glycol, diethylene glycol, diglycerol, propylene glycol, or the like. The effect of adding such polyhydric alcohol is essentially the same effect as would be obtained by treating the high molal alcohol with an alkylene oxide, such as ethylene oxide, propylene oxide, glycidol, or the like, or treating the unpolymerized hydroxylated amine in a similar manner, or treating the polymerized hydroxylated amine in a kindred fashion.

In view of the numerous reactants which have been indicated, it is obvious that one can obtain a variety of condensation products or emulsion-preventing reagents. If a compound or emulsion-preventing agent is not soluble enough, its solubility, or the solubility of its salt, can be increased in various manners, for instance:

(a) Employ a monocarboxy acid having a lower molecular weight;

(b) Use fewer moles of acid per mole of original unpolymerized polyamine;

(c) Select as a raw material an amine having a greater number of amino nitrogen atoms;

(d) Select as a raw material an amine having a greater number of hydroxy hydrocarbon radicals;

(e) Select as an amine a compound having both an increased number of nitrogen atoms and an increased number of hydroxy hydrocarbon radicals;

(f) Add a polyhydric alcohol, such as glycerol, at some selected stage subsequently indicated; and (g) Vary the degree of polymerization of the hydroxylated amine in the manner subsequently indicated.

Inversely, it will sometimes happen that the condensation product or emulsion-preventing agent is too soluble; or, to state the matter another way, it does not possess sufficient surface activity for the purpose intended. In such instances it may be desirable to decrease the hydrophile properties. It is unnecessary to remark that this requires only a reversal of one or more of the procedures previously enumerated. It is believed that in view of what has been said, the compounds of the kind contemplated can be prepared without further directions or illustrations. However, for the purpose of indicating the preferable type of condensation product or emulsion-preventing agent, attention is directed to the following examples:

*Polymerized hydroxylated polyamine.—*
*Example 1*

Triethylene tetramine is treated with four moles of ethylene oxide to produce tetraethanol triethylene tetramine. Approximately three-fourths of a percent of caustic soda is added to this material by weight and the hydroxylated amine is heated for approximately two to four hours at about 245–260° C. The mass is stirred constantly and any distillate is condensed and reserved for re-use after an intermediate re-running step. As polymerization takes place, as indicated by elimination of water and increase in viscosity of the residual mass, cryoscopic molecular weight determinations are made on the polyamine or a suitable salt, such as the acetate, or the like, and polymerization is stopped when such molecular weight determinations indicate that the material based on average values is largely dimeric.

The reaction with ethylene oxide may be indicated in the following manner:

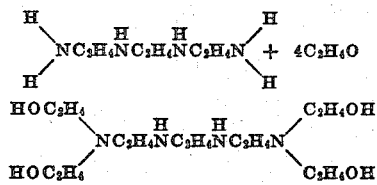

If the above formula be rewritten as

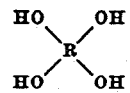

in which R represents the tetravalent radical to which the four hydroxyls are attached, then the simplest linear condensation reaction is indicated in the following manner:

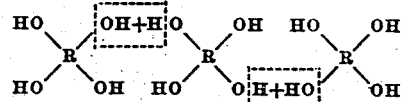

Cognizance must be taken of the fact that cyclic structures may form, as indicated by the following possible reaction:

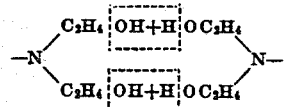

Additionally combined cyclic and acyclic forms may appear.

*Polymerized hydroxylated polyamine.—*
*Example 2*

The same procedure is employed as in the previous example, except that heating is conducted for approximately 1–3 hours longer. Tests are made in the same manner as previously indicated, and polymerization is stopped when determinations indicate that the average molecular weight is equivalent to a trimeric product.

*Polymerized hydroxylated polyamine.—*
*Example 3*

The same procedure is followed as in Example 2, preceding, except that a slightly higher temperature is employed, i. e., about 10° higher, and if need be, a slightly longer time; and the process is continued until the product indicates an average molecular weight equal to or exceeding that of a tetramer.

*Polymerized hydroxylated polyamine.—*
*Example 4*

The preceding examples are repeated, adding one mole of glycerol for each mole of hydroxylated amine employed.

*Polymerized hydroxylated polyamine.—*
*Example 5*

Examples 1–3, inclusive, are repeated, adding two moles of glycerol for each mole of hydroxylated polyamine employed.

*Polymerized hydroxylated polyamine.—*
*Example 6*

Tetraethanol pentaethylene hexamine is substituted for tetraethanol triethylene tetramine in Examples 1–5.

*Polymerized hydroxylated polyamine.—*
*Example 7*

Tetraethanol tetraethylene pentamine is substituted for tetraethanol pentaethylene hexamine in the preceding example.

*Polymerized hydroxylated polyamine.—*
*Example 8*

Pentaethanol tetraethylene pentamine is substituted for tetraethanol tetraethylene pentamine in the preceding example.

Polymerized hydroxylated polyamine.— Example 9

Hexa-ethanoltetraethylene pentamine is substituted for pentaethanol tetraethylene pentamine in the previous example.

The mixture of such reactants, i. e., the polymerized hydroxylated amine and the high molal carboxy acid or its equivalent, are prepared in such ratio that there is present at least one mole of the high molal fatty acid or its equivalent for each mole of polymerized amine. My preference is to use a dimeric, trimeric, or tetrameric form of the polymerized hydroxylated amine. My preference also is to use a fatty acid, rather than any other type of monocarboxy acid, and particularly to employ unsaturated fatty acids, such as soyabean fatty acids, teaseed oil fatty acids, corn oil fatty acids, and the like. The most desirable unsaturated fatty acid appears to be ricinoleic acid. It is used, if desired, in a more available form, to wit, the glyceride. In other words, in subsequent Example 1 and succeeding examples, it is really preferable to substitute one pound mole of triricinolein (castor oil) for three pound moles of ricinoleic acid.

The temparature of condensation has previously been indicated. In a general way, it is above 100° C.; but any temperature below the point of decomposition of the hydrotropic condensation materials may be employed. Although the preferred range indicated in succeeding examples is 150–175° C., in many instances very valuable reagents are obtained by using a considerably higher temperature, to wit, 250–300° C.

Condensation product.—Example 1

A mixture is prepared, using one pound mole each of the following: Ricinoleic acid and a material of the kind exemplified by polymerized hydroxylated polyamine, Example 1. The products are mixed and stirred constantly, holding the temperature at approximately 150–175° C., until no unreacted high molal acid remains. The bulk of such high molal acid generally disappears within two to three hours; but sometimes it is necessary to heat from 4 to 6, or even 10, hours to obtain substantially complete reaction. The final completion of reaction is indicated in various ways, and usually by the fact that the product gives a clear solution in dilute acetic acid.

The simplest aspect of the dimeric compound illustrating polymerized hydroxylated polyamine is indicated by the following:

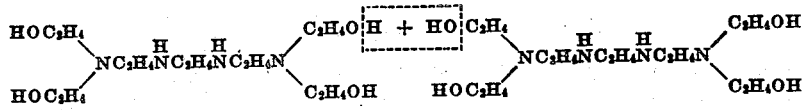

Ricinoleic acid may be indicated by the formula RCOOH. Acylation would preferably involve an amino hydrogen atom (amidification), rather than a hydroxyl hydrogen atom (esterification). Thus, the probable reaction which takes place involving the previous compound so as to form an amide, is indicated in the following manner:

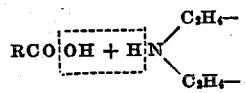

Condensation product.—Example 2

One pound mole of ricinoleic acid in Example 1 above is replaced by two pound moles.

Condensation product.—Example 3

Oleic acid is used instead of ricinoleic acid in Examples 1 and 2, preceding.

Condensation product.—Example 4

Abietic acid is used instead of ricinoleic acid in Examples 1 and 2, preceding.

Condensation product.—Example 5

Naphthenic acid is used instead of ricinoleic acid in Examples 1 and 2, preceding.

Condensation product.—Example 6

The examples of the type previously indicated are repeated, with the addition of one pound mole of glycerol for each pound mole of the high molal acid.

Condensation product.—Example 7

Example 6 is repeated, using two pound moles of glycerol in each instance instead of one pound mole.

Condensation product.—Example 8

Examples 1–7, preceding, are repeated, using polymerized hydroxylated polyamines, Examples 2–9, instead of Example 1, as in the previous examples.

In the hereto appended claims, reference to the use of the condensation product is intended to include the base form, i. e., the chemical combination of water, and also the salt form such as the lactate, acetate, citrate, or the like.

It has been previously pointed out that a large variety of the materials herein described represents surface-active materials, or more specifically, cation-active materials. There is a wide variety of uses for surface-active materials. See, for example, U. S. Patent No. 2,174,131, dated September 26, 1939, to Lubs. Some of these purposes are particularly adapted to the use of a cation-active material, or a cation-active material which is at least self-emulsifiable. Briefly, then, specific uses for my product include use as wetting, detergent, and leveling agents in the laundry, textile, and dyeing industry as wetting agents and detergents in the acid washing of fruit and in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles such as sewage; coal washing waste water, and various trade wastes and the like; as germicides and insecticides; and emulsifiers for cosmetics, spray oils, water-repellent textile finish, etc. These uses are by no means exhaustive. The products may be used as demulsifiers in the manner that such materials are most widely used in the production of crude oil or removal of salt in refinery practice.

Products of the kind herein contemplated may be considered as intermediate products and may be reacted with other materials, particularly dibasic acids, or fractional salts or esters thereof, such as oxalic acid, maleic acid, phthalic acid, oxalic acid, sodium acid phthalate, octyl acid phthalate, triricinolein monophthalate, triricinolein diphthalate, and the like, to give valuable products which may be used for the various purposes enumerated in the preceding paragraph.

I have found that the particular chemical compounds or reagents herein employed as emulsion-preventing agents may also be used for other purposes, for instance, as a break inducer in doctor treatment of the kind intended to sweeten gasoline. See U. S. Patent No. 2,157,223, dated May 9, 1939, to Sutton.

Having thus described my invention, what I claim as new and desire to secure by Letters Patent is:

1. A polymerized condensation product, obtained by heat polymerization in presence of an alkaline catalyst from (A) A hydroxylated polyethylene amine having at least 3 amino nitrogen atoms and not more than 6 amino nitrogen atoms and having 2 hydroxyalkyl radicals attached to each of the 2 terminal amino nitrogen atoms and with the proviso that at least 1 of the intermediate nitrogen atoms be part of a secondary amino group; and (B) At least 1 mole of a high molecular weight monocarboxy acid having at least 8 carbon atoms; said polymerized condensation product containing a plurality of

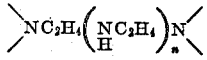

radicals, in which $n$ is a whole number from 1 to 4 and the acyl radical of the said high molecular weight monocarboxy acid is amido-linked to an intermediate nitrogen atom and said plurality of polyamino radicals are ether-linked to each other.

2. The condensation product of claim 1, wherein the higher molecular weight monocarboxy acid is a fatty acid.

3. The condensation product of claim 1, wherein the higher molecular weight monocarboxy acid is an unsaturated fatty acid.

4. The condensation product of claim 1, wherein the higher molecular weight monocarboxy acid is an unsaturated fatty acid, and $n$ is 2.

5. The condensation product of claim 1, wherein the higher molecular weight monocarboxy acid is an unsaturated fatty acid, and $n$ is 3.

6. The condensation product of claim 1, wherein the higher molecular weight monocarboxy acid is an unsaturated fatty acid, and $n$ is 4.

7. A method for the manufacture of the polymerized condensation product, as defined in claim 1, involving the step of heat polymerization in presence of an alkaline catalyst;

(A) A hydroxylated polyethylene amine having at least 3 amino nitrogen atoms and not more than 6 amino nitrogen atoms and having 2 hydroxyalkyl radicals attached to each of the 2 terminal amino nitrogen atoms and with the proviso that at least 1 of the intermediate nitrogen atoms be part of a secondary amino group; and (B) At least 1 mole of a high molecular weight monocarboxy acid having at least 8 carbon atoms; said polymerized condensation product containing a plurality of

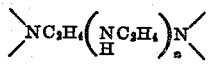

radicals, in which $n$ is a whole number from 1 to 4 and the acyl radical of the said high molecular weight monocarboxy acid is amido-linked to an intermediate nitrogen atom and said plurality of polyamino radicals are ether-linked to each other.

MELVIN DE GROOTE.